Feb. 20, 1968     F. FREY     3,369,424
TRANSMISSION CONTROL MECHANISMS
Filed Oct. 20, 1965     5 Sheets-Sheet 3

INVENTOR.
FRED FREY
BY William Wolfe
ATTORNEY

INVENTOR.
FRED FREY
BY William Wolfe
ATTORNEY

United States Patent Office 3,369,424
Patented Feb. 20, 1968

3,369,424
TRANSMISSION CONTROL MECHANISMS
Fred Frey, 501 Grandview Ave., Brooklyn, N.Y. 11237
Filed Oct. 20, 1965, Ser. No. 498,521
11 Claims. (Cl. 74—473)

ABSTRACT OF THE DISCLOSURE

This invention relates to a transmission control for use in vehicles equipped with manually operated transmissions which have four speeds forward and a reverse speed, whereby to dispense with the "H" pattern of hand movement for the forward speeds and to substitute a shifting pattern in which hand movement from first speed to second to third to fourth is in a single plane thus eliminating any lateral hand movement when shifting from first gear through to fourth gear.

My invention relates generally to automobile equipment and more particularly to a transmission control for use in automobiles equipped with manually operated transmissions which have four speeds forward and a reverse speed.

A purpose of the present invention is to dispense with "H" pattern of hand movement for the forward speeds and substitute a shifting pattern in which hand movement from first speed to second to third to fourth is in a single plane thus eliminating any lateral hand movement when shifting from first gear through to fourth gear. This pattern of movement is far superior to the "H" pattern in that it eliminates danger of incorrect gear selection, provides automatic selection of the proper gear, and permits extremely rapid gear shifting. The speed of gear shifting is of utmost importance in racing cars where a fraction of a second often means the difference between winning and losing.

Another purpose of the invention is to devise a transmission control with four speeds forward and a reverse in which can be operated either by the conventional "H" type or by a movement in a single plane for the forward speeds depending upon the presence or absence of a single adapter pin.

A further object is to devise a four speed forward and a reverse transmission control which is simple to operate and which is difficult to incorrectly operate.

Another object of the invention is to devise a four speed forward and reverse transmission control in which there is a minimum of lateral hand travel.

A further object of the invention is to devise a simple, durable, inexpensive and easily assembled four speed forward and reverse manual transmission control which can be rendered operable by the presence of an adapter pin, to function under the "H" type hand movement and by the absence of the adapter pin to function with hand movement confined to forward backward movements to shift from first gear through to fourth gear.

Another object is to so form portions of the housing of the control as to limit the twist of the handle or stick and thereby prevent its binding on the bearing shaft.

My gear shift control is characterized by a shift stick which is carried by a bearing shaft and which stick forks a selector pin, the bearing shaft being encircled by a spring which continuously urges the stick into a plane perpendicular to the axis of the bearing shaft.

The control is further characterized by a center housing borne by a bearing shaft, carrying a selector pin and provided with a cam-way and a third-fourth gear lever borne by the bearing shaft and having an opening aligned with the selector pin, and a cam-lockout riding in the opening in the third-fourth lever, said cam-lockout being motivated by an extending arm riding in the cam-way of the center housing whereby the movement of the housing to a neutral position raises the cam-lockout and permits the entrance of the selector pin.

It is further characterized by a cam-way positioned in a movabe center housing and a cam having one section riding in the housing and a second section capable of blocking an opening in a gear control lever to prevent the entrance of a selector pin capable of operating the gear control lever.

It is further characterized by a spacer element, and a first and second gear control lever. The lever and spacer each having a large opening to admit an enlarged selector pin head and a smaller opening adjacent and contiguous with the large opening to permit rotation of the first gear control lever by a selector pin without interference from the spacer element, and rotation of a reverse gear control lever by the selector pin without interference by the spacer and first gear control lever.

The control is also characterized by an ability to be operated in a pattern in which hand movement to shift from first gear to second to third to fourth is in a single plane because of a free stick forked about a selector pin, an anti-rattle spring urging the stick to a normal position and a thrust spring continuously urging the selector pin toward a third speed gear control lever.

The control is characterized by being operable either in a normal gear shift control pattern or a pattern in which the hand movement to shift from first gear to second gear to third gear to fourth gear is in a single plane, depending on the presence or absence of a control pattern pin positioned crosswise in a selector pin.

For further comprehension of the invention and of the objects and advantages thereof, reference will be had to the following description, the accompanying drawings and to the appended claims in which the novel features of the invention are more particularly set forth.

In the accompanying drawings forming a material part of this disclosure:

FIG. 14 is a sectional view along line 14—14 of FIG. 2, FIG. 15 is a diagrammatic sketch of the hand movement of the control stick of my transmission controller when the change pattern pin "x" is inserted in the structure, FIG. 16 is a diagrammatic sketch of the hand movement of the control stick of my transmission controller when the change pattern pin "x" is missing from the structure.

In the drawing and in the specification in which like numerals indicate similar elements a manual four speed forward and reverse transmission control 20 embodies my invention. For ease of reading small letters on the drawing, such as "a," "b," etc., are written in the specification as capitalized—A, B—etc.

Figure 1:
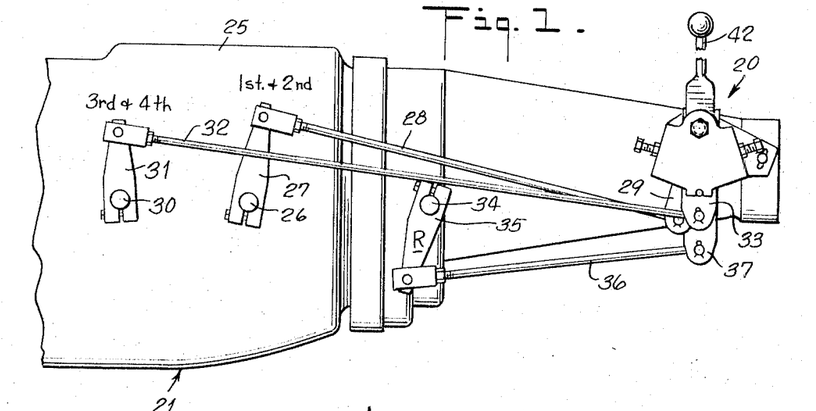
FIG. 1 is a side view of transmission with the invention shown in functioning position.
Figure 2:
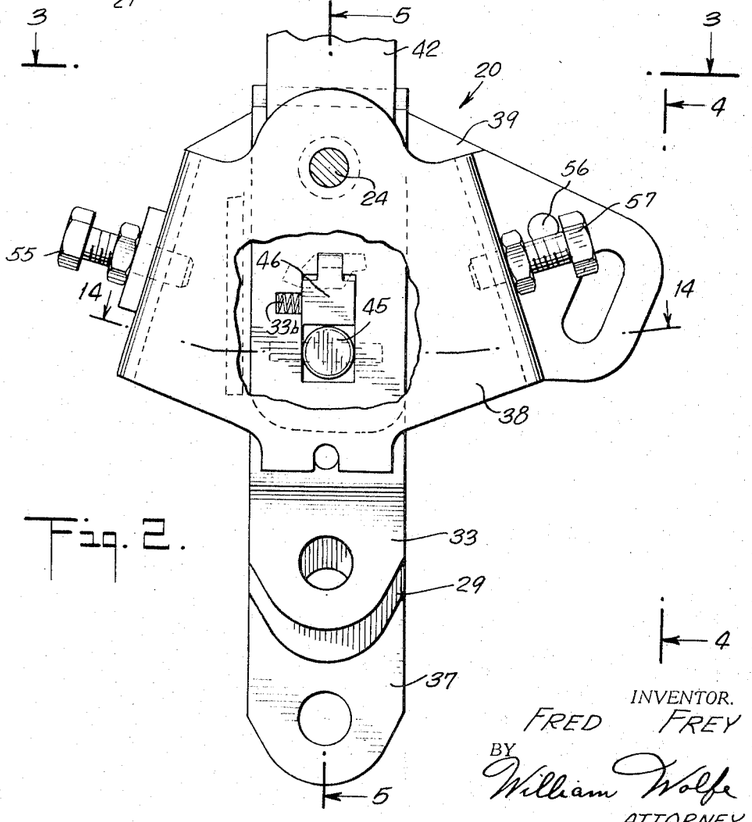
FIG. 2 is a front view of the invention partly broken away.

The transmission control 20 is positioned (FIG. 1) secured to a car transmission 21 in a conventional manner by means of an adapter plate 22 (FIG. 5) and bolts 23 and 24. Conventional gear box 25 has extending from its side a first-second speed gear control shaft 26 which is operated through arm 27 and connecting rod 28 by a first-second lever 29 of the control 20. In a like manner, third-fourth gear control shaft 30 is operated through arm 31 and rod 32 by a third-fourth lever 33 of the control 20 and in a like manner, reverse gear control shaft 34 is operated through arm 35, and rod 36 by reverse lever 37 of the control 20. The securing of first-second speed lever 29 to its operable element (shaft 26) of gear box; third-fourth speed lever 33 to its operable element (shaft 30) and reverse lever 37 to its operable element (shaft 34) are all conventional.

The transmission control 20 (FIG. 5 elements left to right) is comprised of an outer housing 38, a back plate 39 forming a rear element of the housing, third-fourth speed control lever 33, left spacer plate 40, center housing 41, control stick or handle 42, right spacer plate 43, first-second speed control lever 29 and reverse speed control lever 37. In addition there is a bearing shaft 44 a selector pin 45 with an enlarged head 45A at its right end, a cam-lockout 46, an anti-rattle coil spring 47 extending about the bearing shaft 44 and exerting pressure against the stick and center housing, a helical thrust spring 48 extending about the selector pin and urging it toward the third-fourth control lever 33, and a reverse speed lockout spring 49.

Figure 3:
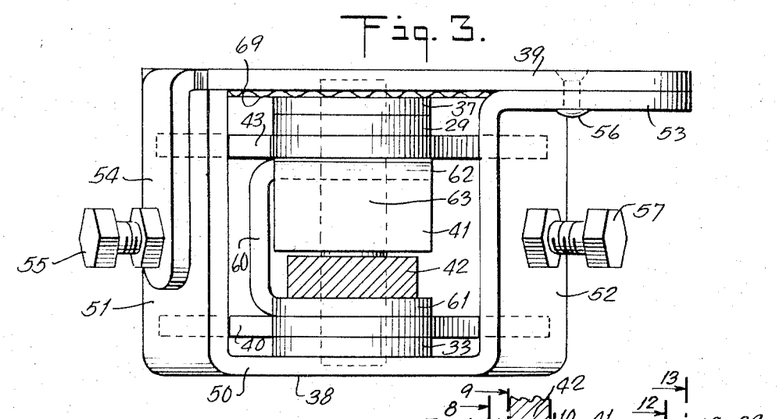
FIG. 3 is a top view looking along the line 3—3 of FIG. 2.
Figure 4:
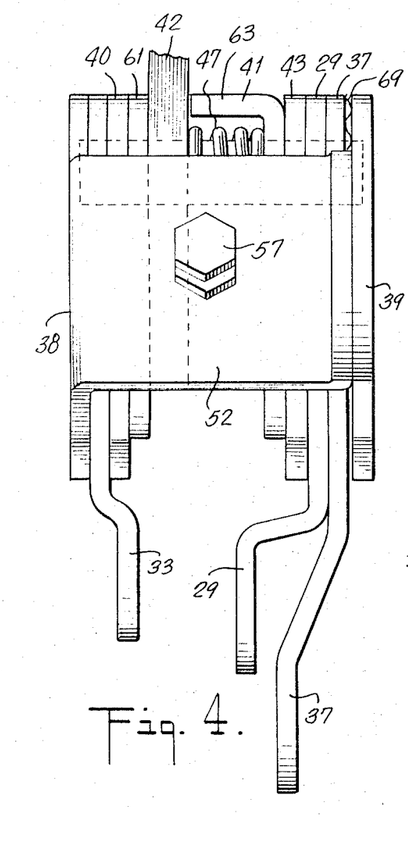
FIG. 4 is a side view looking along the line 4—4 of FIG. 2.

The outer housing 38 (FIGS. 3, 5 and 14) is U shaped having a center section 50 with side extending legs 51 (left) and 52 (right), leg 52 having an angled portion 53. The rear plate 39 forms a closure for the housing as it rests against portion 53 of the housing and an angled section 54, which rests against leg 51. Leg 51 of the housing and section 54 are held together by bolt and nut combination 55, and by rivet 56. Bolt 55 extends through the housing and is set to abut the inner housing. Bolt 57 is set to limit the forward travel of the stick 42. The back section 50 of the outer housing 38 and the rear plate 39 are provided with shouldered holes 58 and 59 respectively to allow bolt 24 to pass through and secure the housing to the adapter plate 22 and also to rotatably support hollow bearing shaft 44 through which bolt 24 axially extends.

The center housing 42 (FIGS. 5, 8, and 10) has a back section 60 with left side wing 61 and right side wing 62 and a cover portion or flange 63 extending horizontally forward from the back and toward the left side wing from the right side wing so as to leave opening "A" therebetween and through which the control stick 42 extends. The left and right side wings and the control stick are all provided with openings or holes 61A, 62A and 64 respectively through which the bearing shaft 44 extends so that they can rotate forward and backward. The space "A" being small limits and determines the angular movement or twist of the control stick and if made small enough will prevent binding or sticking of the stick which could occur without the limiting presence of the cover flange 63. It should be noted that hole 64 is oblong to permit the stick to be angled left and right. The back section is provided with a rivet 65 to secure the reverse speed lockout spring 49 and a stud 65A to hold reverse lockout spring against right wing 62. The left and right wings also are provided with holes 61B and 62B through which the selector pin 45 fits while the stick 42 is provided with a forked arcuate cut out seat 66 which extends about the selector pin. The left wing is also provided with a horizontally directioned rectangular cut out 67 at hole 61B to permit the entrance of change pattern pin "x." In addition left wing 61 is provided with a cut out 68 to provide a cam seat for cam 46.

Figure 5:
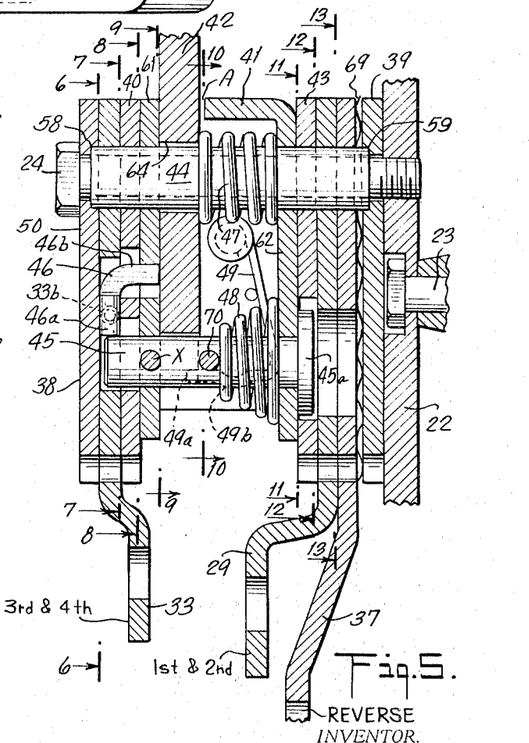
FIG. 5 is a sectional view along line 5—5 of FIG. 2, FIGS. 6, 7, 8, 9, 10, 11, 12, 13 are sectional views as indicated in FIG. 5.
Figure 8:
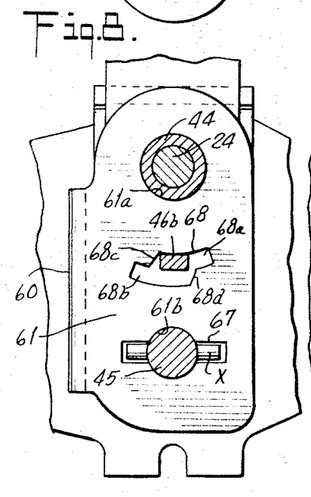
Figure 9:
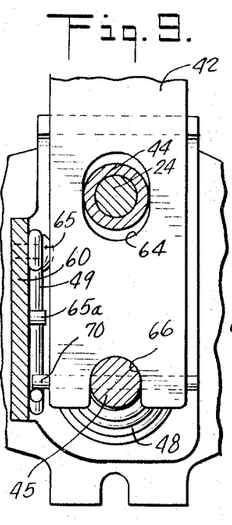
Figure 10:
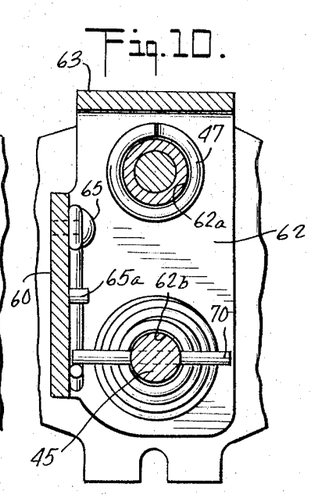

The cam seat lockout cut out 68 is shaped with an upper arcuate portion 68A and a lower arcuate offset portion 68B with upper and lower joining edges 68C and 68D respectively. The follower block member 46 rides downward by contact with edge 68C and upward by contact with 68D.

Figure 7:
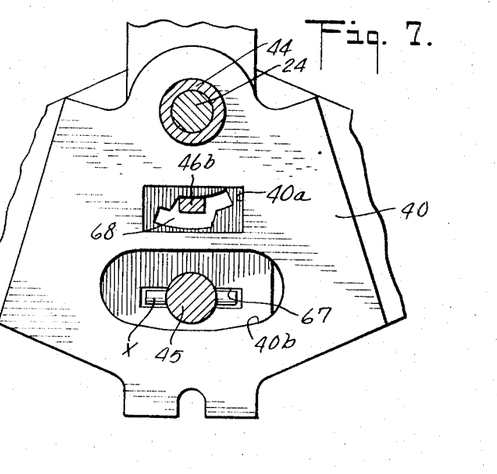

The left spacer plate 40 (FIG. 7) is positioned on the bearing shaft 44 immediately to the left of the left wing 61 of the central housing and is provided with a cut out 40A in which an arm of the cam lockout 46 rides and with a cut out 40B through which the selector pin 45 extends.

Figure 6:
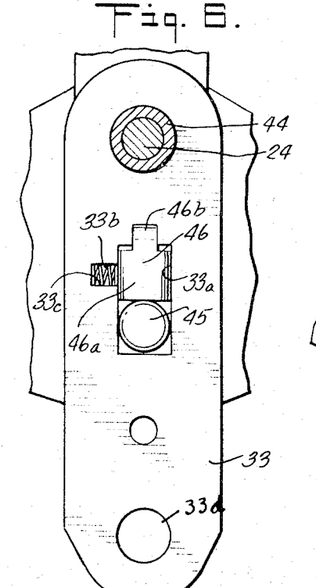

The third-fourth speed lever 33 (FIG. 6) is positioned on the bearing shaft 44 to the left of the spacer plate 40 and is provided with a cut out 33A in which part of the cam-lockout 46 rests and into which the left end of the selector pin can extend. A spring 33B rests in a niche 33C and bears against part of cam 46, retaining it from moving except under cam-way urging. Lever 33 is also provided with hole 33D into which connecting rod 32 extends and to which it is secured so that movement of lever 33 causes rotation of the gear box gear control shaft 30.

The cam-lockout 46 (FIGS. 6 and 7) has a rectangular or square portion 46A which rests in the cut out 33A and an angled arm 46B which extends through the spacer plate 40 and into the cam cut out 68 and rides on its faces 68C and 68D. When the cam 46 is in its upward position there is room in the cut out 33A to permit the selector pin 45 to enter, but when the cam occupies the lower portion of the cut out the selector pin is barred, and the control cannot shift into third-fourth speed. The cam-lockout is held in the cut out 33A by its side walls and by the outer housing 38 and spacer plate 40.

The right spacer 43 is positioned to the right of inner housing right wing 62 (FIGS. 5 and 11) and is provided with a hole 43A through which the bearing shaft 44 extends and an opening 43B. This opening is laterally elongated and its center part enlarged to permit the passage of the enlarged head 45A of the selector pin, the elongation permitting arcuate movement of the selector pin after passage.

The first-second speed lever 29 (FIGS. 5 and 12) is positioned to the right of the right spacer 43 and is provided with a hole 29A through which the bearing shaft 44 extends and a laterally elongated partially round opening 29B, suitable to receive and pass the enlarged selector pin head 45A and also permit arcuate movement of the selector pin after its head has passed through the opening. The partially round part of the opening is contoured to the size of the selector pin head so that when the pin head rests in the opening 29B arcuate movement of the selector pin causes identical movement of the lever but when the pin head has passed the lever, pin movement causes no movement of the lever. In addition lever 29 is provided with hole 29C into which the end of connecting rod 28 extends and to which it is secured so that movement of the lever 29 causes rotation of the gear box gear control shaft 26.

The reverse speed lever 37 (FIGS. 5 and 13) is positioned to the right of lever 29 (first-second speed) and is provided with a hole 37A through which the bearing shaft 44 extends and a hole 37B into which the enlarged selector pin head 45A can extend and fit so that lateral movement of the selector pin causes similar movement of the lever 37. Thus when the selector pin head 45A rests in hole 37B a forward movement of the stick handle translates the selector pin and causes the reverse speed lever 37 to rotate forcing the reverse gear 34 of the transmission to operate.

End-play sheet-spring 69 (FIGS. 3, 5 and 14) is borne by bearing shaft 44 and is positioned between reverse lever 37 and the back plate 39 of the outer housing. Sheet spring 69 is formed with horizontal undulations or waves and is springy compressible so as to hold the third-fourth lever 33, spacer plate 40, center housing 41, spacer plate 43, first-second lever 29 and reverse lever 37 conveniently together without binding and presses against the back plate 39 of the outer housing.

The anti-rattle spring 47 (FIG. 5) which is coiled about the bearing shaft 44 extends between the inside of right wing 62 of the center housing and the stick 42 and holds the stick against the center housing left wing 61.

The helical thrust spring 48 (FIGS. 5 and 14), which is coiled about the selector pin 45, extends between the inside of right wing 62 of the outer housing and roll pin 70 which pin is positioned crosswise through the selector pin 45. Spring 48 pushes the selector pin through the roll pin toward the left and toward the third-fourth lever and also urges the stick to an upright position.

The reverse speed lockout spring 49 (FIG. 5) is pinned at one end to the back section 60 of the center housing by rivet 65 and extends downwardly against the right wing 62 of the center housing and terminates in a horizontal leg 49A. This spring leg is provided with a curved section 49B suitable for catching and holding roll pin 70 so that the roll pin and selector pin cannot be pushed further toward the right without added pressure on the stick which is forked about the selector pin 45 between the roll pin 70 and the left wing 61 of the center housing. The location of the curved section 49B of the spring 49 is such that the roll pin 70 is caught when the selector pin head is seated in the first-second lever 29 hole 29B. Thus to go from first-second gear to reverse gear, added pressure to the left must be used on the stick to jump the roll pin 70 out of its seat in the spring curved section 49B. Stud 65A, in the back section 60 of the center housing is positioned to rest against the left side of the downwardly extending part of spring 49 and keep the spring against the right wing 62 of the center housing.

It should be noted (FIG. 14) that the flanged ends of the spacer plates 40 and 43 fit snuggly between the front and back of the outer housing and cannot move. Also that the bolt 55 is set to limit the amount of rotation of the stick.

Figures 11, 12, 13, 14, 15, 16:
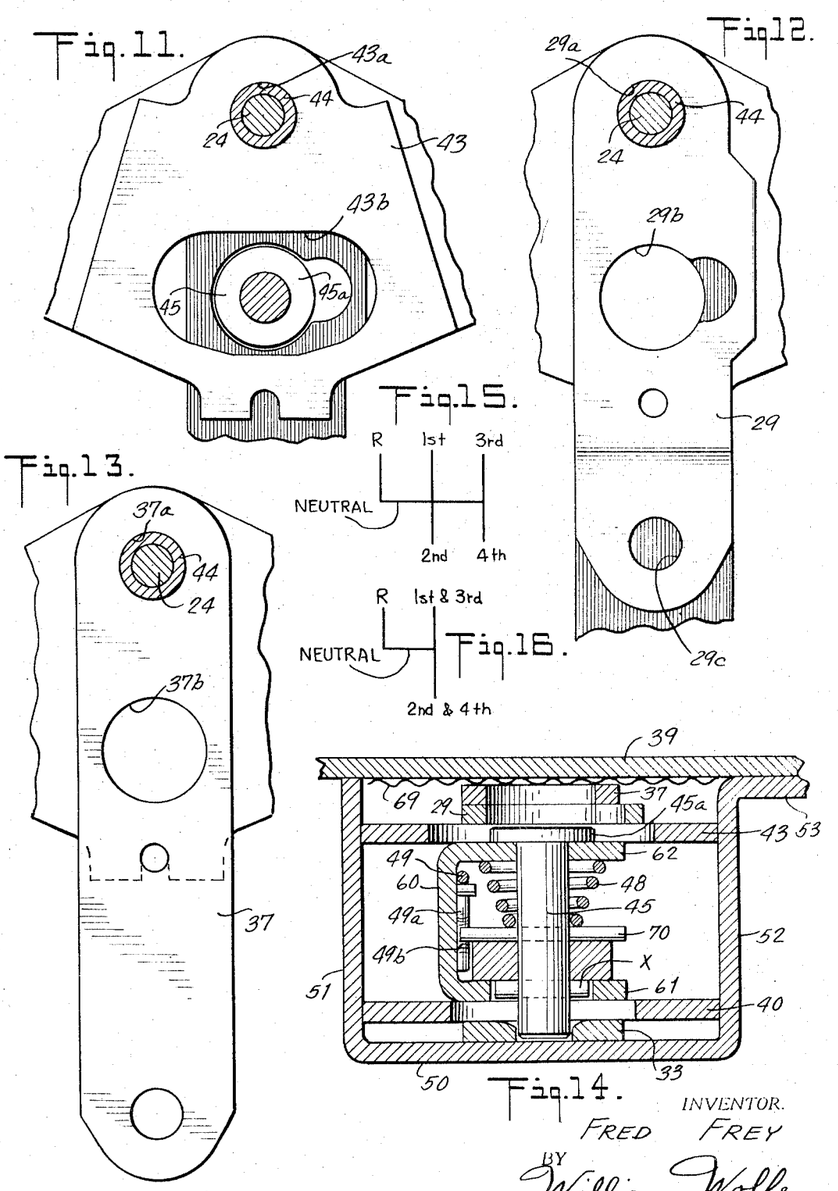

The transmission control 20 can function either with or without the presence of change pattern pin "x"; with it in position the hand movement of the stick is shown in FIG. 15 and in its absence the hand movement is shown in FIG. 16. The change pattern pin "x" is positioned crosswise through the selector pin to the left of and adjacent the stick and holding the stick against the cross pin 70. It should be noted that in the absence of the pin "x," the anti-rattle spring 47 prevents the stick from tilting right or left and holds it against the left wing of the center housing. However, when the lower end of the stick is held toward the right between pin "x" and pin 70 on the selector pin 45 and the anti-rattle spring 47 pushes the midportion of the stick to the left, its upper end must move left out of the plane normal to the axis of the bearing 44. Thus when the selector pin head 45A is engaged in levers 29 or 37, the stick is tilted toward the left. However, when pin "x" is absent, the stick is always held at the left against the left wing 61 of the center housing unless manually controlled.

In the neutral position, the stick 42, levers 29, 33 and 37 and the center housing 41 are in alignment and the lockout cam 46 is in the up position being held by its spring 33B, and the selector pin 45 is pushed to the left by the thrust spring 48.

To shift from neutral to the first gear position, the stick 42 is moved left compressing the thrust spring 48 and the anti-rattle spring 47 and moving the selector pin 45 so that its head 45A engages the opening in lever 29. The reverse lockout spring 49 snaps onto the cross pin 70, preventing the selector pin from entering reverse lever 37 unless additional pressure is applied to the stick to overcome the spring caught pin. The stick is moved forward, rotating about bearing shaft 44, causing the center housing 41 and lever 29 to move to the back. The movement of the center housing 41 past the lever 33, which holds the lockout cam 46, pushes the cam 46 downward blocking the opening 33A in the lever 33. The movement of the cam downward is caused by the riding of the cam arm 46B against the face 68C of the cut out 68 in the left wing 61 of the center housing. The lockout spring 33B holds the cam in its down position.

To shift from first gear position to second gear position, the stick 42 is pulled straight back. The center housing 41 and the first-second lever 29 move forward pivoting about the bearing shaft 44. While the center housing is passing the neutral position, the selector pin 45 is prevented from entering the opening 33A in lever 33 by the cam-lockout 46A which is in the down position. The selector pin can enter the third-fourth lever 33 only when the center housing 41 and third-fourth lever 33 are in alignment in the neutral position. As the center housing continues to move forward and the selector pin 45 and the opening 33A in the third-fourth lever 33 are in alignment, the cam guideway 68 in the center housing forces the lockout cam arm 46B up the guideway side 68D and the cam-lockout 46A along the opening 33A in the lever 33. The lockout spring 33B holds the lockout cam 46A in its up position. The center housing 41, lever 29 and stick 42 continue to move to their final position. It should be noted that when lever 29 is in its final position, the selector pin and its enlarged head 45A cannot move to the left or right out of engagement as spacer 43 to the left and lever 37 to the right retain it in position.

To shift from second gear position to third gear position, (change pattern pin "x" absent), the stick is pushed straight forward, causing the center housing 41 and lever 29 to move backward. When they enter the neutral position they are in alignment with the third-fourth lever 33, allowing the helical thrust spring 48, bearing against cross pin 70 in selector pin 45, to push the selector pin left into the third-fourth lever 33 opening 33A, and disengaging the enlarged right end 45A of the selector pin from the first-second lever 29. The center housing, stick and third-fourth lever move to the rear and their final position.

To shift from third gear position to fourth gear position, the stick is pulled straight back causing the center housing 41 and third-fourth lever to move forward about bearing shaft 44 to their final position.

To shift to the reverse gear position, the stick must be moved first from the gear in which it is in to the neutral position and then pulled toward the driver (left), causing the selector pin 45 to push to the right against the thrust spring 48. This sidewise movement continues until the reverse lockout spring 49 snaps into position around the cross pin 70. Additional pressure enables the operator to overcome the lockout spring pressure and move the selector pin 45 further to the right and into the opening 37B in the reverse lever 37. The selector pin 45 must pass through the opening 29B in the first-second lever 29 to engage the opening 37B in the reverse lever 37. The stick is pushed forward causing the center housing 41 and reverse lever 37 to move backward and into their final position. It should be noted that once the selector pin enlarged head 45A is positioned in the reverse lever 37 and the lever moved backward, the enlarged head 45A of the selector pin cannot move to the right or left out of engagement as lever 29 to the left and plate 39 retain it in position.

To disengage the reverse gear, the stick 42 is pulled back to the neutral position. The center housing 41 and the reverse lever 37 follow to the neutral position and the openings in all the levers are in alignment and allow the selector pin 45 to move toward the left under the force of the thrust spring 48 and into the opening 33A in the third-fourth lever 33.

The helical thrust spring 48 continuously functioning on the selector pin 45 through the cross pin 70 causes the pin 45 to automatically move to the left and engage the third-fourth lever 33 when the first-second lever 29 reaches neutral after the center housing cam-way has raised the cam 46A, clearing the opening for the entrance of the selector pin. Thus only a forward movement of the hand on the stick is required to shift from second gear to third gear (change pattern pin absent). This direct line shifting from first to second to third to fourth gear is an objective of the invention as it minimizes the time required to reach the fourth gear, provides a fool-proof selection of third gear without any manual manipulation of the stick and eliminates cross overs and possible errors which could result in stripped gears. Even a few seconds gained in direct, instead of cross over shifting into third gear, becomes a factor in racing where the speed is such that a fraction of a second saved or gained can become an important factor in a race.

Figure 17:
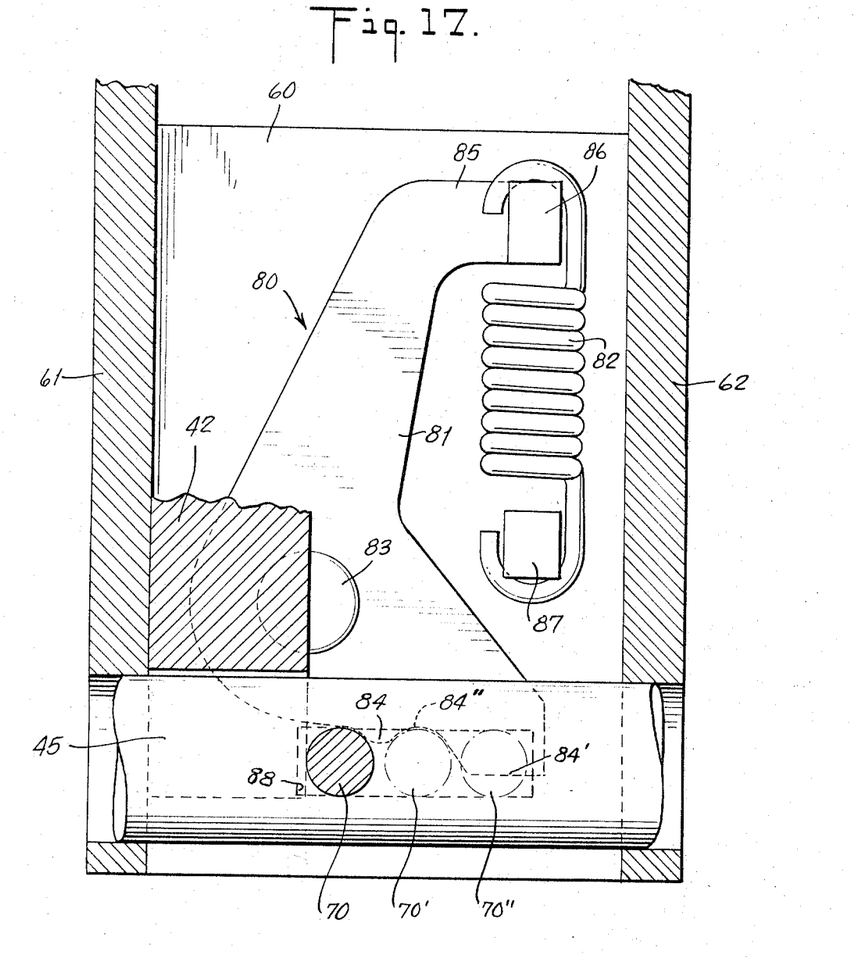
FIG. 17 is a sectional detail showing a variation in the structure of the reverse speed lock-out mechanism.

A variation in the structure of the reverse speed lever lock-out mechanism (spring 49) is shown in FIG. 17. The lock-out mechanism 80, which prevents the selector pin enlarged head from being moved from a position in the first-second speed lever to a position in the reverse lever unless additional lateral pressure is applied to the stick, is comprised of a latch 81 and a coiled spring 82. The latch 81, which is pivotally held by the pin 83 against the back 60 of the center housing, is provided at its lower end with a node or hump 84 and a downward projection 84' forming an indent 84" therebetween, the indent 84 being suitably positioned and of a size to releasably engage the Rollpin 70 and hold it against light pressure but release it against greater pressure and at upper end with a side angled arm 85 carrying an outstanding lug 86. One end of the spring 82 is secured to the back of the center housing by the lug 87 and the other end is held by the lug 86 of the latch. The spring 82 by its downward pressure on the upper end of the latch causes the indent in the lower end of the latch always to be in a position to grasp and temporarily hold the Rollpin whenever the selector pin is moved into the first-second speed lever.

The several positions if the Rollpin 70 in the reversing operation are shown in FIG. 17 as follows: cross-hatched when the selector pin is in neutral, by dashed Rollpin 70' when the selector pin head is in the first-second lever and by the dashed Rollpin 70" when the selector pin is in the reverse lever.

It should also be noted that the back 60 of the center housing is provided with a cut-out 88 into which the Rollpin 70 extends. The purpose of this is to prevent rotation of the selector pin and to hold the Rollpin in proper position to function with the latch indent 84.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new and desire to secure by United States Letters Patent is:

1. In a transmission control mechanism, a bearing shaft, a center housing, said housing having a back part and side wings and being rotatably supported by the bearing shaft, and each wing being defined by an opening therethrough, a plurality of levers, each of said levers being adapted to be connected to a speed gear in the transmission, and each lever being rotatably supported by the bearing shaft and each being characterized by an opening therein and all the openings being alignable and said levers being positioned outside and to the sides of said center housing wings, a selector pin, said pin being positioned to extend through the openings in the wings of the center housing and alignable with the openings in the levers and having an enlarged head at one end and an engaging means extending sidewise to the pin intermediate the side wings and said pin being axially movable in the wings so as to be able to be positioned with an end in one of the openings in a lever, a control stick, said stick being positioned intermediate the side wings and adjacent one of them and being carried by the bearing shaft, and one of its ends forking the selector pin between a side wing and the engaging means of the selector pin, a first spring, said spring being positioned adjacent the bearing shaft and functioning against the center housing and stick to urge the stick sidewise toward one of the center housing wings, a cam follower, said cam follower having a locking portion and an angled arm and one of the levers opening for carrying both the blocking portion of the cam follower and the unheaded end of the selector pin, and said blocking portion of the cam follower normally blocking the entrance of the selector pin and one of the center housing wings being defined by an opening, some of whose sides form a cam-way, and said angled arm of the cam follower resting and riding in the cam-way and the blocking portion of the cam follower being moved as the center housing is rotated relative to the lever bearing the blocking portion of the cam follower whereby a movement of the stick and resultant movement of the center housing wing can unblock the opening in the one lever to permit entrance of the selector pin.

2. A transmission control mechanism as defined in claim 1, in which said second spring continuously urges said selector pin toward the cam bearing lever.

3. In a transmission control mechanism as defined in claim 1, a pair of spacers, one positioned at the outside of each center housing wing and being borne by the bearing shaft, one of the spacers being defined by a plurality of openings, one suitable for passage of the smaller end of the selector pin and the other opening permitting the angled arm of the cam follower to extend therethrough, and the other spacer being defined by a partially round, partially elongated opening, the partially round portion being suitable to seat the enlarged head of the selector pin and the elongated portion to permit the selector pin to be translated after the enlarged head has passed through the spacer.

4. In a transmission control mechanism, a bearing shaft, a center housing, said housing having a back part and side wings and being rotatably supported by the bearing shaft, and each wing being defined by an opening therethrough, a plurality of levers, each of said levers being adapted to be connected to a speed gear in the transmission, and each lever being rotatably supported by the bearing shaft and each being characterized by an opening therein and all the openings being alignable and said levers being positioned outside and to the sides of said center housing wings, a selector pin, said pin being positioned to extend through the openings in the wings of the center housing and alignable with the openings in the levers and having an enlarged head at one end and an engaging means extending sidewise to the pin intermediate the side wings and said pin being axially movable in the wings so as to be able to be positioned with an end in one of the openings in a lever, a control stick, said stick being positioned intermediate the side wings and adjacent one of them and being carried by the bearing shaft, and one of its ends forking the selector pin between a side wing and the engaging means of the selector pin, a first spring, said spring being positioned adjacent the bearing shaft and functioning against the center housing and stick to urge the stick sidewise toward one of the center housing wings, a second spring, said second spring being positioned adjacent the selector pin and functioning against the center housing and engaging means of the selector pin to urge the selector pin axially in the same direction as the first spring urges the control stick and a selector pin end into a lever opening whereby the control stick can be tilted sidewise moving the selector pin against the second spring urgings, into a lever positioned at one side of the center housing and the springs will continuously be exerting pressure to return the pin toward a center wing, and into the opening in another lever, and having in addition the first of its levers positioned outside and to one side of said center housing and a second and a third lever positioned outside and to the other side of the housing, and having in addition its second lever positioned nearer the housing than the third lever and the opening in the second lever having a partially round, partially elongated configuration suitable for engaging the enlarged head of the selector pin and being translated thereby and for permitting the head to pass through and for the selector pin to be moved laterally therein without corresponding movement of the lever through which it passes, and the opening in the third lever being of a size suitable to engage the enlarged head of the selector pin and be operated thereby, and in addition having a spacer plate and an outer housing, said spacer plate being supported by the bearing shaft and being positioned between a center housing wing and said second lever and being defined by a partially round, partially laterally elongated opening suitable to seat the enlarged head of the selector pin and permit the free translation of the selector pin when the selector pin head is in the second lever, and said outer housing supporting the bearing shaft and extending adjacent said third lever and providing a side closure to the opening in the third lever and preventing movement of the selector pin beyond the third lever, and in addition said center housing having a back element extending between its side wings, and a third spring, said third spring being secured to the back element of the center housing and having catching means so positioned as to be capable of gripping said engaging means of the selector pin when its enlarged head rests in the second lever and holding the pin from further movement toward the third lever except under the use of additional pressure on the control stick.

5. In a transmission control mechanism, a bearing shaft, a center housing, said housing having a back part and side wings and being rotatably supported by the bearing shaft, and each wing being defined by an opening therethrough, a plurality of levers, each of said levers being adapted to be connected to a speed gear in the transmission, and each lever being rotatably supported by the bearing shaft and each being characterized by an opening therein and all the openings being alignable and said levers being positioned outside and to the sides of said center housing wings, a selector pin, said pin being positioned to extend through the openings in the wings of the center housing and alignable with the openings in the levers and having an enlarged head at one end and an engaging means extending sidewise to the pin intermediate the side wings and said pin being axially movable in the wings so as to be able to be positioned with an end in one of the openings in a lever, a control stick, said stick being positioned intermediate the side wings and adjacent one of them and being carried by the bearing shaft, and one of its ends forking the selector pin between a side wing and the engaging means of the selector pin, a first spring, said spring being positioned adjacent the bearing shaft and functioning against the center housing and stick to urge the stick sidewise toward one of the center housing wings, a second spring, said second spring being positioned adjacent the selector pin and functioning against the center housing and engaging means of the selector pin to urge the selector pin axially in the same direction as the first spring urges the control stick and a selector pin end into a lever opening whereby the control stick can be tilted sidewise moving the selector pin against the second spring urgings, into a lever positioned at one side of the center housing and the springs will continuously be exerting pressure to return the pin toward a center wing, and into the opening in another lever, and having in addition the first of its levers positioned outside and to one side of said center housing and a second and a third lever positioned outside and to the other side of the housing, and having in addition its second lever positioned nearer the housing than the third lever and the opening in the second lever having a partially round, partially elongated configuration suitable for engaging the enlarged head of the selector pin and being translated thereby and for permitting the head to pass through and for the selector pin to be moved laterally therein without corresponding movement of the lever through which it passes, and the opening in the third lever being of a size suitable to engage the enlarged head of the selector pin and be operated thereby, and in addition having a spacer plate and an outer housing, said spacer plate being supported by the bearing shaft and being positioned between a center housing wing and said second lever and being defined by a partially round, partially laterally elongated opening suitable to seat the enlarged head of the selector pin and permit the free translation of the selector pin when the selector pin head is in the second lever, and said outer housing supporting the bearing shaft and extending adjacent said third lever and providing a side closure to the opening in the third lever and preventing movement of the selector pin beyond the third lever, and in addition a deterrent catch means, said means secured to the housing and capable of gripping the engaging means of the selector pin when its enlarged head rests in the second lever and holding the pin from further movement toward the third lever except under the use of additional pressure on the control stick.

6. In a transmission control mechanism, a bearing shaft, a center housing, said housing having a back part and side wings and being rotatably supported by the bearing shaft, and each wing being defined by an opening therethrough, a plurality of levers, each of said levers being adapted to be connected to a speed gear in the transmission, and each lever being rotatably supported by the bearing shaft and each being characterized by an opening therein and all the openings being alignable and said levers being positioned outside and to the sides of said center housing wings, a selector pin, said pin being positioned to extend through the openings in the wings of the center housing and alignable with the openings in the levers and having an enlarged head at one end and an engaging means extending sidewise to the pin intermediate the side wings and said pin being axially movable in the wings so as to be able to be positioned with an end in one of the openings in a lever, a control stick, said stick being positioned intermediate the side wings and adjacent one of them and being carried by the bearing shaft, and one of its ends forking the selector pin between a side wing and the engaging means of the selector pin, a first spring, said spring being positioned adjacent the bearing shaft and functioning against the center housing and stick to urge the stick sidewise toward one of the center housing wings, a second spring, said second spring being positioned adjacent the selector pin and functioning against the center housing and engaging means of the selector pin to urge the selector pin axially in the same direction as the first spring urges the control stick and a selector pin end into a lever opening whereby the control stick can be tilted sidewise moving the selector pin against the second spring urgings, into a lever positioned at one side of the center housing and the springs will continuously be exerting pressure to return the pin toward a center wing, and into the opening in another lever, and having in addition the first of its levers positioned outside and to one side of said center housing and a second and a third lever positioned outside and to the other side of the housing, and having in addition its second lever positioned nearer the housing than the third lever and the opening in the second lever having a partially round, partially elongated configuration suitable for engaging the enlarged head of the selector pin and being translated thereby and for permitting the head to pass through and for the selector pin to be moved laterally therein without corresponding movement of the lever through which it passes, and the opening in the third lever being of a size suitable to engage the enlarged head of the selector pin and be operated thereby, and in addition having a spacer plate and an outer housing, said spacer plate being supported by the bearing shaft and being positioned between a center housing wing and said second lever and being defined by a partially round, partially laterally elongated opening suitable to seat the enlarged head of the selector pin and permit the free translation of the selector pin when the selector pin head is in the second lever, and said outer housing supporting the bearing shaft and extending adjacent said third lever and providing a side closure to the opening in the third lever and preventing movement of the selector pin beyond the third lever, a deterrent spring catch means, said spring having a securing portion secured to the back of the housing and extending portion abutting a side wing and a further extending portion having a gripping means thereon and said gripping means capable of engaging the engaging means of the selector pin when its enlarged head rests in the second lever and holding the pin from further movement toward the third lever except under the use of additional pressure on the control stick urging the enlarged head to the selector pin toward the third lever.

7. A transmission control mechanism comprised of,
a bearing shaft,
a center housing, said housing having a back part and side wings and being rotatably supported by the bearing shaft and each wing being defined by an opening therethrough,
a plurality of levers, each lever being rotatably supported by the bearing shaft and each being characterized by an opening therein and all the openings being alignable and the first of said levers being positioned outside a center wing and adapted to be connected to the third-fourth speed gear of the transmission, the second of said levers being positioned outside the second center wing and being adapted to be connected to the first-second speed gear of the transmission, the third of said levers being positioned outside and adjacent the second of said levers and being adapted to be connected to the reverse speed gear of the transmission,
a selector pin, said pin being positioned to extend through the openings in the wings of the center housing and alignable with the openings in the levers and having an enlarged head at the end adjacent the second and third of said levers and said pin having an engaging means positioned intermediate the side wings and said pin being axially movable in the wings so as to be able to be positioned with an end in an opening in a lever,
a control stick, said stick being positioned intermediate the side wings and adjacent the wing adjacent the first lever and said stick being carried by the bearing shaft, and one of its lower end forking the selector pin between the side wing adjacent the first lever and the engaging means of the selector pin,
a first spring, said spring being positioned adjacent the bearing shaft and functioning against the center housing and stick to urge the stick sidewise toward the center housing wing adjacent the first lever,
a second spring, said second spring being positioned adjacent the selector pin and functioning against the center housing and engaging means of the selector pin to urge the selector pin axially in the same direction the first spring urges the stick and an end of the selector pin into the opening in the first lever,
a third spring, said spring being positioned with an end secured to the center housing and having a catching means, the means being capable of gripping the engaging means of the selector pin when the enlarged end of the selector pin rests in the opening in the second lever and holding the pin stationary in this position except under the urging of additional pressure forcing the release of the pin and causing its enlarged end to move into the third lever,
a cam follower, said cam follower having a portion resting in the opening in the first lever and a portion resting in the opening in the side wing adjacent the first lever and the latter opening immediately above referred to having sides forming a cam-way along which the carried cam follower portion travels causing the cam follower portion in the lever to reciprocate from a position barring the entrance of the smaller end of the selector pin to a position permitting its entrance,
whereby a rotation of the stick causes a rotation of the housing wings and the cam to move unblocking the entrance to the first lever and the second spring to force the selector small end into the first lever without lateral movement of the stick.

8. A transmission control as defined in claim 7, and having in addition a change pattern pin, said change pattern pin being positioned on the selector pin between the stick and the housing wing adjacent the first lever whereby the stick cannot move freely under the urging of the first spring.

9. A transmission control as defined in claim 7, and the opening in the second lever being partially round and partially laterally elongated and the partially round portion being large enough to permit the entrance of the enlarged head of the selector pin and the lever to be rotated thereby and the elongated portion being of a sufficient size to permit translation of the pin after its head has passed the lever and the opening in the third lever being large enough to admit the enlarged head and the lever to be translated thereby.

10. A transmission control, as defined in claim 7, and having a detachable change pattern pin, said pin, when in use, being positioned on the selector pin between the stick and the housing wing adjacent the first lever whereby when the change pattern pin is present, it holds the stick at an angle to the bearing shaft when the selector pin enlarged head is engaged in the second or third lever, but when the change pattern pin is absent, the first spring can force the stick to return to a position normal to the bearing shaft.

11. In a transmission control mechanism, a bearing shaft, a center housing, said housing having a back part and side wings and being rotatably supported by the bearing shaft, and each wing being defined by an opening therethrough, a plurality of levers, each of said levers being adapted to be connected to a speed gear in the transmission, and each lever being rotatably supported by the bearing shaft and each being characterized by an opening therein and all the openings being alignable and said levers being positioned outside and to the sides of said center housing wings, a selector pin, said pin being positioned to extend through the openings in the wings of the center housing and alignable with the openings in the levers and having an enlarged head at one end and an engaging means extending sidewise to the pin intermediate the side wings and said pin being axially movable in the wings so as to be able to be positioned with an end in one of the openings in a lever, a control stick, said stick being positioned intermediate the side wings and adjacent one of them and being carried by the bearing shaft, and one of its ends forking the selector pin between a side wing and the engaging means of the selector pin, a first spring, said spring being positioned adjacent the bearing shaft and functioning against the center housing and stick to urge the stick sidewise toward one of the center housing wings, a second spring, said second spring being positioned adjacent the selector pin and functioning against the center housing and engaging means of the selector pin to urge the selector pin axially in the same direction as the first spring urges the control stick and a selector pin end into a lever opening whereby the control stick can be tilted sidewise moving the selector pin against the second spring urgings, into a lever positioned at one side of the center housing and the springs will continuously be exerting pressure to return the pin toward a center wing, and into the opening in another lever, and having in addition the first of its levers positioned outside and to one side of said center housing and a second and a third lever positioned outside and to the other side of the housing, and having in addition its second lever positioned nearer the housing than the third lever and the opening in the second lever having a partially round, partially elongated configuration suitable for engaging the enlarged head of the selector pin and being translated thereby and for permitting the head to pass through and for the selector pin to be moved laterally therein without corresponding movement of the lever through which it passes, and the opening in the third lever being of a size suitable to engage the enlarged head of the selector pin and be operated thereby, and in addition having a spacer plate and an outer housing, said spacer plate being supported by the bearing shaft and being positioned between a center housing wing and said second lever and being defined by a partially round, partially laterally elongated opening suitable to seat the enlarged head of the selector pin and permit the free translation of the selector pin when the selector pin head is in the second lever, and said outer housing supporting the bearing shaft and extending adjacent said third lever and providing a side closure to the opening in the third lever and preventing movement of the selector pin beyond the third lever, and in addition a deterrent catch mechanism, said mechanism comprised of a latch and a spring, said latch being pivoted to the center housing and having an indent suitable for engaging the engaging means of the selector pin and an extending lug suitable for holding one end of the spring and said spring secured to the center housing and to the lug of the latch whereby the indent of the latch is positioned to grasp the engaging means of the selector pin when its enlarged head rests in the second lever and hold the pin from further movement toward the third lever except under the use of additional pressure on the control stick urging the enlarged head of the selector pin toward the third lever.

References Cited
UNITED STATES PATENTS

| | | | |
|---|---|---|---|
| 1,949,221 | 2/1934 | Simpson et al. | 74—473 X |
| 2,922,315 | 1/1960 | Primeau | 74—473 |
| 3,052,135 | 9/1962 | Hurst et al. | 74—473 |
| 3,082,639 | 3/1963 | Almquist | 74—473 |
| 3,169,409 | 2/1965 | Babacz | 74—502 X |
| 3,192,793 | 7/1965 | Hurst et al. | 74—476 |
| 3,216,274 | 11/1965 | Hurst et al. | 74—476 |
| 3,250,143 | 5/1966 | Lyon | 74—473 |
| 3,306,126 | 2/1967 | Hobbins | 74—473 |

FRED C. MATTERN, JR., *Primary Examiner.*

C. F. GREEN, *Assistant Examiner.*